US011078711B1

(12) United States Patent
Garrone, Jr. et al.

(10) Patent No.: US 11,078,711 B1
(45) Date of Patent: Aug. 3, 2021

(54) METHODS AND SYSTEMS FOR AUTOMATICALLY DETERMINING LEVEL OF UNCLOSED DOOR IN CHUTE APPLICATIONS

(71) Applicant: Elcon, Inc., Minooka, IL (US)

(72) Inventors: Frank J. Garrone, Jr., Minooka, IL (US); Roberto Michelassi, Aurora, IL (US); Patrick Barrett, Chicago, IL (US)

(73) Assignee: Elcon, Inc., Minooka, IL (US)

( * ) Notice: Subject to any disclaimer, the term of this patent is extended or adjusted under 35 U.S.C. 154(b) by 144 days.

(21) Appl. No.: 15/630,919

(22) Filed: Jun. 22, 2017

Related U.S. Application Data

(60) Provisional application No. 62/353,900, filed on Jun. 23, 2016.

(51) Int. Cl.
*E05F 15/70* (2015.01)
*E05F 15/53* (2015.01)
*B65G 11/00* (2006.01)

(52) U.S. Cl.
CPC .............. *E05F 15/70* (2015.01); *E05F 15/53* (2015.01); *B65G 11/00* (2013.01); *E05Y 2400/445* (2013.01); *E05Y 2400/45* (2013.01); *E05Y 2900/10* (2013.01)

(58) Field of Classification Search
CPC ........... E04F 17/12; E05F 15/70; E05F 15/53; B65G 11/02; B65G 11/00; E05Y 2400/445; E05Y 2400/45; E05Y 2900/10
USPC ......... 193/2 R, 14, 28, 29, 33; 49/13, 24, 68
See application file for complete search history.

(56) References Cited

U.S. PATENT DOCUMENTS

| 4,002,229 A * | 1/1977 | Washington ............. A62C 2/06 193/34 |
| 5,031,829 A * | 7/1991 | Shantzis ................ B65F 1/0093 209/706 |
| 5,551,576 A * | 9/1996 | Importico ............. B65F 1/0093 193/2 R |
| 5,568,871 A * | 10/1996 | Shantzis ................. B07C 5/362 209/703 |
| 5,645,172 A * | 7/1997 | Shantzis ................. B07B 13/00 209/703 |
| 2005/0030185 A1* | 2/2005 | Huisenga ........... G01R 19/2509 340/635 |

(Continued)

OTHER PUBLICATIONS

Wilkinson Hi-Rise (WHR Holdings, LLC, Wilkinson Hi-Rise Operation and Maintenance Instructions for Trash & Recycling Chute Systems, published Oct. 2010, obtained from https://www.whrise.com/wp-content/uploads/2014/01/OM-Manual-WHR-TrashChute-v1.1b-1210-copy.pdf (last accessed on Jul. 25, 2019). (Year: 2010).*

(Continued)

*Primary Examiner* — Theodore V Adamos
(74) *Attorney, Agent, or Firm* — Charles T. Riggs, Jr.

(57) ABSTRACT

The present subject matter relates to systems and methods for automatically determining the level of an open chute door in connection with a chute system in a building structure. The position of the open door on the chute is automatically determined, without requiring any configuration at each door on the chute, utilizing a daisy chain wire signal connection and a chute busy wire (enable signal) signal connection. Pulses or other signals are counted at a base station to determine the level of the open door.

20 Claims, 4 Drawing Sheets

(56) References Cited

U.S. PATENT DOCUMENTS

| | | | |
|---|---|---|---|
| 2005/0155837 A1* | 7/2005 | Nyquist | B65F 1/0093 193/34 |
| 2007/0043987 A1* | 2/2007 | Sutardja | G01R 31/2884 714/724 |
| 2011/0245938 A1* | 10/2011 | Picco | H05B 37/0254 700/90 |
| 2015/0287390 A1* | 10/2015 | Kakeko | H04L 61/2038 345/1.1 |
| 2016/0097206 A1* | 4/2016 | Embley | E04F 17/12 193/34 |

OTHER PUBLICATIONS

Control Solutions Minnesota, Frequently Asked Questions abotu RS-486, https://www.csimn.com/CSI_pages/RS-485-FAQ.html (obtained from https://web.archive.org/web/20160816053931/https://www.csimn.com/CSI_pages/RS-485-FAQ.html), Aug. 16, 2016 (Year: 2016).* thefreedictionary.com, daisy chain definition, https://encyclopedia2.thefreedictionary.com/daisy+chain (obtained from https://web.archive.org/web/20120826003808/https://encyclopedia2.thefreedictionary.com/daisy+chain), Aug. 26, 2012 (Year: 2012).*

Electrical Engineering StackExchange, "Help with Device identification in a chain," post by Cary, David on Feb. 22, 2011, https://electronics.stackexchange.com/questions/5188/help-with-device-identification-in-a-chain (Year: 2011).*

\* cited by examiner p = PULSE SEND/DETECT CIRCUITRY

F = FORCE CIRCUITRY
FORCES CHUTE IDLE/BUSY HIGH
WHEN DOOR CLOSES

DOOR SWITCH
- SWITCH IS NORMALLY CLOSED
- OPENS WHEN DOOR IS OPEN
- OR WHEN CHUTE IS BUSY

CHUTE IDLE/BUSY WIRE (ENABLE)
- HIGH = IDLE
- LOW = BUSY

DAISY CHAIN WIRE
- PULLS CHUTE/IDLE BUSY WIRE HIGH
  WHEN ALL DOORS CLOSED.
- CARRIES PULSES

METHODS AND SYSTEMS FOR AUTOMATICALLY DETERMINING LEVEL OF UNCLOSED DOOR IN CHUTE APPLICATIONS

TECHNICAL FIELD

The exemplary teachings herein pertain to methods and systems relating to the field of chute system as may be found in building structures, for example as disclosed in U.S. Pat. No. 7,017,728 issued to Nyquist on Mar. 28, 2006, and U.S. Pat. No. 7,350,636 issued to Smith et al. on Apr. 1, 2008, the entire disclosures of which are herein incorporated by reference.

BACKGROUND

As discussed in U.S. Pat. No. 7,350,636, chute systems are typically used by persons in buildings to dispose of trash or to send laundry to lower floors in the building. The chute systems generally consist of a large, vertically-oriented main chute that has a plurality of branches, each of which originates in an opening on one of the individual levels of the building structure. Each opening to the chute system is provided with a door to cover that opening when the chute is not in use. A person can open the door and place a bag of garbage or laundry, for example, through the opening and then release the bag. The bag slides down the chute branch to the main chute and then drops or slides downwardly to a collection bin disposed a spaced number of floors away from the opening in question.

In some chute systems, the doors are configured such that only one door can be opened at any given time. Thus for example, in a chute system having three doors on three levels respectively, if the door on the second level is open, the doors on the first and third level become locked and cannot be opened until the open door on the second level is properly closed. A common problem in chute applications is determining what door on the chute is open (or stuck open) and preventing any other chute door from being opened. In most existing chute systems, a maintenance person is required to go from chute door to chute door in order to locate the one that is open, locking out chute access. In multi-story buildings, this process can take a long time, resulting in the chute being out of service for a long period of time.

The vast majority of existing chute door systems have no method for determining the door level of an open door. It is possible that the doors of a chute system can be directly configured with relatively complicated and/or expensive devices, such that the door level of an open door can be determined. For example, a door could be configured at the time of installation or replacement with DIP switches, or pre-programmed address parameters that are unique to a particular door, however such chute systems would be considerable more expensive than the simple chute systems that have no way to determine door level.

Further, such configuration methods usually require a much more technical installation crew for the chute system than is generally available. There is also the problem of incorrect configuration, or forgetting to configure a door. This results in incorrect identification of the open door, or possibly even a chute system that does not work at all.

Accordingly, there is a need for a better, more convenient and less expensive method and system to automatically determine the floor level of an open chute. The methods and systems disclosed herein fulfill such need. The system disclosed herein provides a method for determining where the problem door is located, and identifies for the maintenance person the level where the door is open, without the need to configure each door with additional devices or hardware.

The methods and systems disclosed herein, which may be implemented electronically, work in a "daisy chain" or "bucket brigade" fashion. The chute doors are connected in a chain, starting from the bottom of the chute. Thus each door is connected to two other doors, one above, and one below (except of course the bottom and topmost doors).

When a door is opened, that door passes information, i.e., a packet or "bucket" of information, with a single countable "item" such as an electrical pulse or other signal, referred to generically as a "marble," in the "bucket," to its neighboring doors. When the next door in the chain receives the "bucket," that door simply adds its single "marble." and then passes the "bucket" on to the next door it is connected with (i.e. not back to the door that handed it the "bucket" in the first place). This continues on down (or up) the chain of doors. When the "bucket" reaches the last door in the chain, the last door adds its "marble" and then passes the "bucket" to a base station. The base station can then count the "marbles" in the "bucket" to determine the level of the open door.

In a preferred embodiment, the method and system uses electrical pulses. Each door has an input/output port that is connected via the "daisy chain" of doors to its neighboring doors. When a door is opened, it sends a single pulse (the countable "item" or "marble") out both of its ports to its neighbors. When the neighboring door sees a pulse arrive at one of these ports, it sends it out the other port, and then adds a pulse of its own. This continues on down the chain until the base station is reached. The base station simply counts the pulses to determine the level of the open door.

The methods and systems disclosed herein can also be used in conjunction with a system for hands free operation of chute doors, providing electro-mechanical control of the door. Once a problem door is located and identified, a signal can be sent to that problem door to open and close automatically in an attempt to get the problem door to close properly and reset or return the chute system to normal operation.

The methods and systems disclosed herein provide a vast improvement over other systems, because no configuration at the door itself is required, greatly simplifying the installation and maintenance of the chute door system.

Additional objectives, advantages and novel features will be set forth in part in the description which follows, and in part will become apparent to those skilled in the art upon examination of the following and the accompanying drawings or may be learned by production or operation of the examples.

BRIEF DESCRIPTION OF THE DRAWINGS

The drawing figures depict one or more implementations in accord with the present teachings, by way of example only, not by way of limitation. In the drawing figures, like reference numerals refer to the same or similar elements.

DETAILED DESCRIPTION

The following description refers to numerous specific details which are set forth by way of examples to provide a thorough understanding of the relevant method(s), system(s) and device(s) disclosed herein. It should be apparent to those skilled in the art that the present disclosure may be practiced without such details. In other instances, well known methods, procedures, components, hardware and/or circuitry have been described at a relatively high-level, without detail, in order to avoid unnecessarily obscuring aspects of the present disclosure. While the description refers by way of example to methods and systems relating to chute systems, it should be understood that the method(s), system(s) and device(s) described herein may be used in any situation where determining the location of open doors, windows or other positionable devices in a building or other structure or area, is needed or desired.

Disclosed herein are methods and systems to automatically determine the level of an open chute door, in connection with a chute system. The methods and systems will automatically determine the position of the open door on the chute, without requiring any configuration at each door on the chute, such as with DIP switches, programmable memory devices, etc. This eliminates any problems of improperly configured doors, since no configuration is required at each door on the chute; thereby greatly simplifying installation of the doors.

Figure 1:
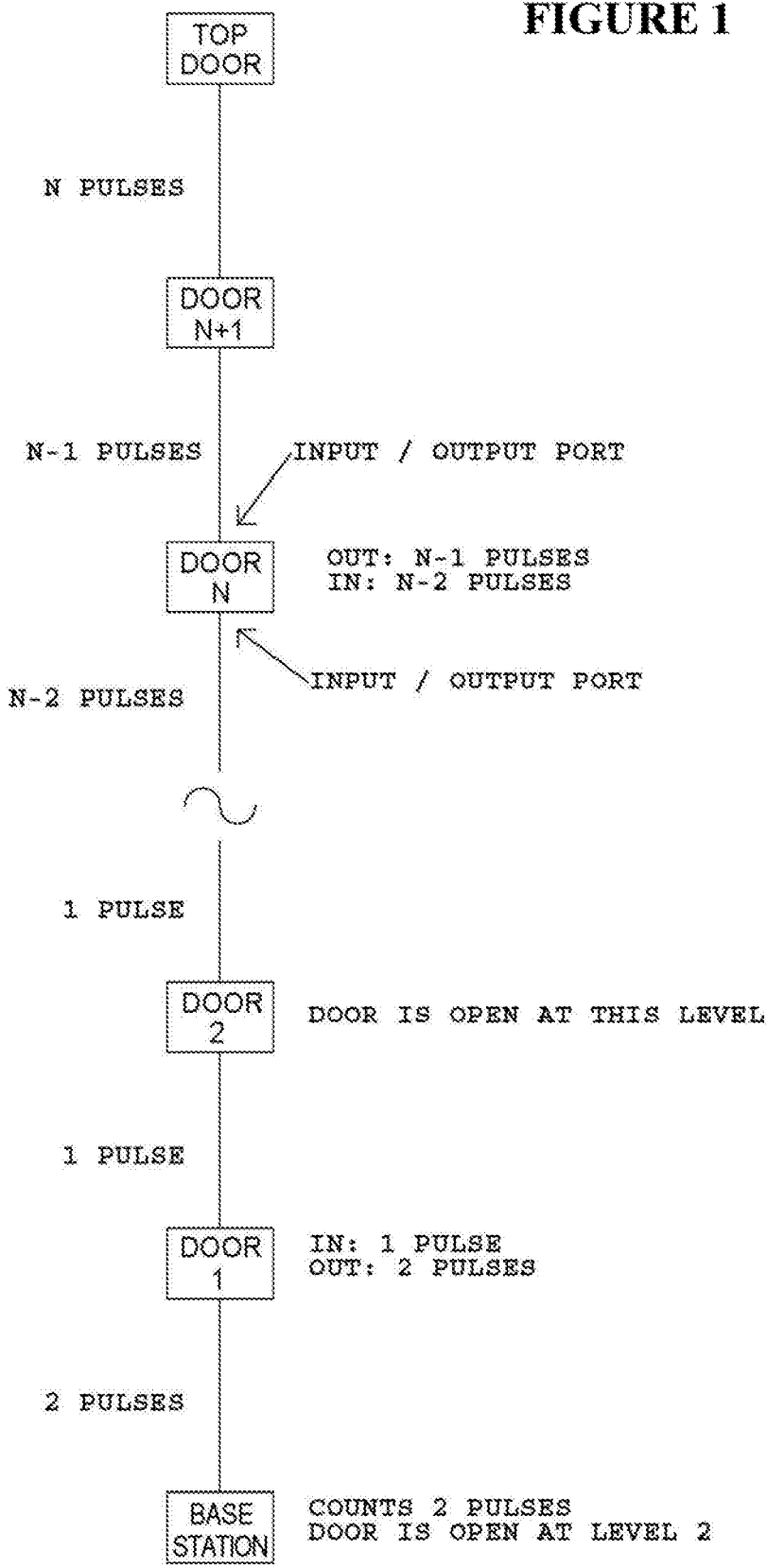
FIG. 1 is a schematic diagram of the method and system of the present disclosure.

FIG. 1 shows the basic arrangement and interconnections of the doors and the base station at a high level. It also shows the basic, exemplary algorithm results of a method and system using pulses.

Figure 2:
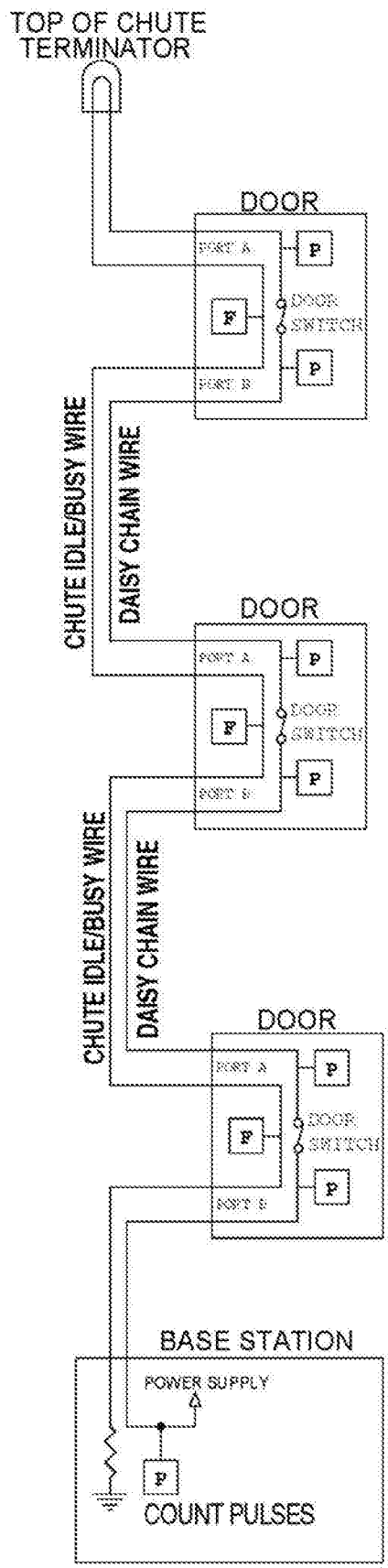
FIG. 2 is a diagram of the basic signal connections for the method and system of the present disclosure.

FIG. 2 shows a more detailed signal connections diagram. There are two basic signal wires: The Daisy Chain wire and The Chute Busy wire (also known as Enable signal).

Normally all door switches are closed. The power supply connected in the base station to the Daisy Chain wire is thus fed up through the door switch in each door all the way to the top of the chute. At the top of the chute, the daisy chain wire is connected to the Chute Busy (Enable) wire by means of a special termination cable. This results in the Enable wire being pulled up (high) to power supply voltage. Thus indicating the chute is idle—all doors are closed.

When a door is opened the following occurs. The open door opens its door switch. This disconnects the power supply from the base station to all doors above this door. The disconnection of power causes the Enable signal to be pulled down (low) by the resistor on this signal in the base station. The chute is now detected as being busy because the Enable signal is low. When each door detects that the chute is busy (i.e Enable is low), it will open its own door switch. This creates a bunch of isolated Daisy chain wires going between each door. The open door then sends a pulse using the pulse circuitry onto both daisy chain wires connected to it. The "bucket brigade" proceeds as was previously described.

When the door is again closed, the following occurs. The door closes its door switch. The door forces the Enable signal up (high) with the force circuitry. The chute is now detected as idle again. When each door detects that the chute is now idle again, they close their respective door switches.

Figure 3:
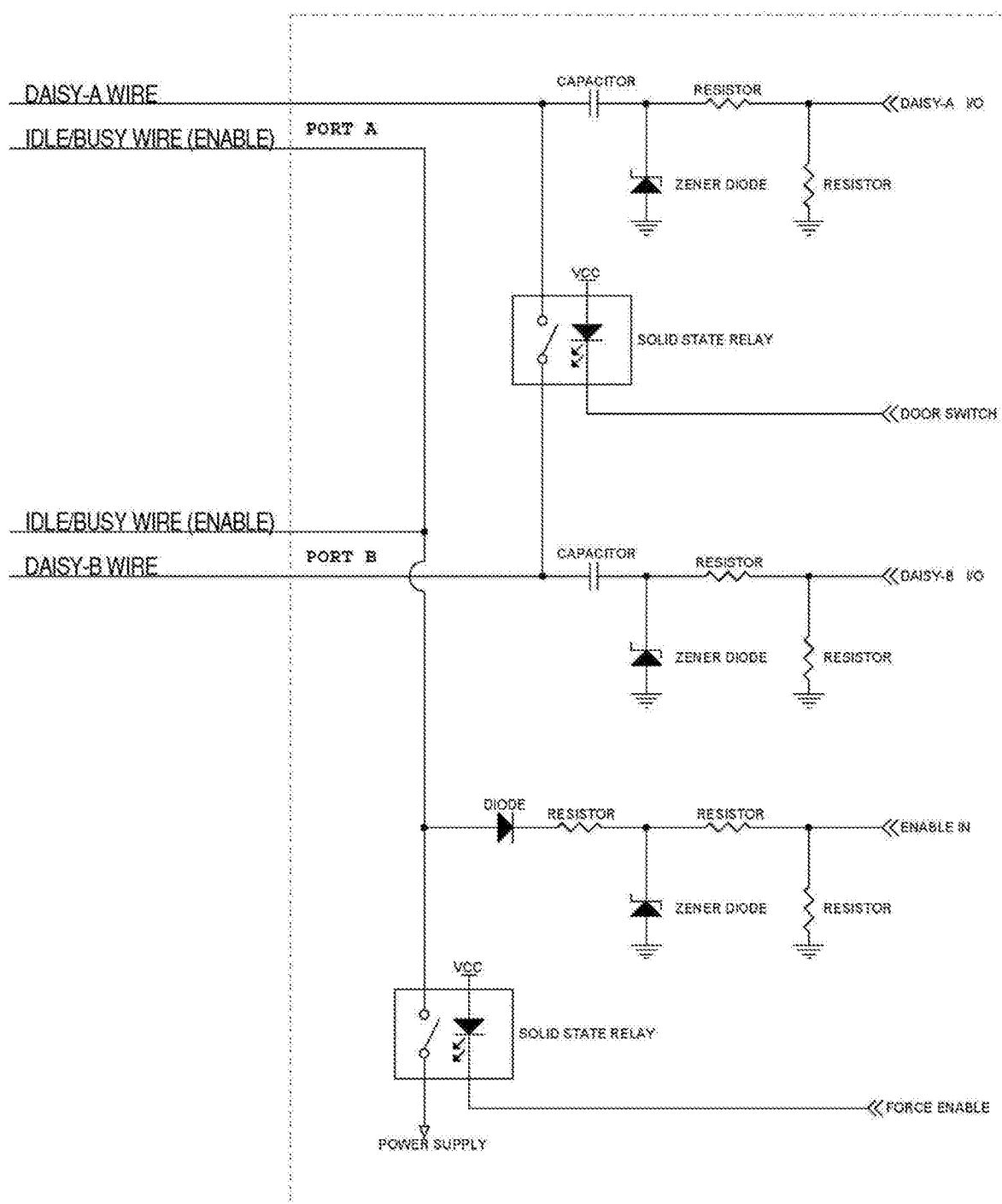
FIG. 3 is a circuit diagram of an exemplary door circuit of the method and system of the present disclosure.

FIG. 3 shows the door circuit and the specific circuitry therein used to transmit the pulses, detect them, and control both the door switch and enable signals.

The methods and systems disclosed herein provide various advantages and features, including but not limited to the following.

No configuration required at all on the doors themselves.
The connection points for the signals on the doors are interchangeable, i.e., the installer is not required to connect the cables to the door in a specific way in order for the system to work.
The system can be expanded to a very large number of doors without modification.
The system is immune to differences in power or ground voltages across the power supplied to the chute doors.
The system is very tolerant of electrical noise.
The system uses no extra wires, wires already required to interlock the doors are leveraged to provide this extra information.

The methods and systems disclosed herein can be implemented in various ways or alternate embodiments, including but not limited to the following.

Instead of using pulses, a voltage level could be used. The open door could send out a particular voltage level, each door would subtract (or add) a small incremental voltage to the level and pass it on to the next door in the chain. Measurement of the level at the base station could be used to determine the door level.

A current could be used. The open door could inject a current onto the signal line to the neighboring doors. Each door would detect that current, and add (or subtract) a small incremental current. The base station could then measure the current and determine the level of the door that is open.

Resistance could be used. Each door would inject a fixed, pre-determined resistance into the signal line. The open door would connect the signal line to a reference voltage (possibly system ground). The base station would measure the resistance of the signal line to determine the level of the open door.

Pulse duration could be used. The open door could send out a pulse of a pre-determined duration to its neighbors. Each door receiving the pulse would add to (or subtract from) the duration of pulse it received. The base station would measure duration of the pulse, and determine the level of the door that is open.

Frequency could be used. The open door would send a pre-determined fixed frequency to its neighboring doors. Each door would measure the incoming frequency and then add to (or subtract from) that value when sending out the frequency to the next door in the chain. The base station would measure the frequency, and determine the level of the open door.

Pulse delay could be used. In this case the base station would send the initial pulse to the first door. Each door would receive the pulse, and then send it to the next door after a short delay. When the pulse reaches the open door, it signals the base station (via a separate signal line) that it has seen the pulse. The base station measures the delay between sending the pulse and receiving the confirmation from the open door to determine the level of the open door.

Figure 4:
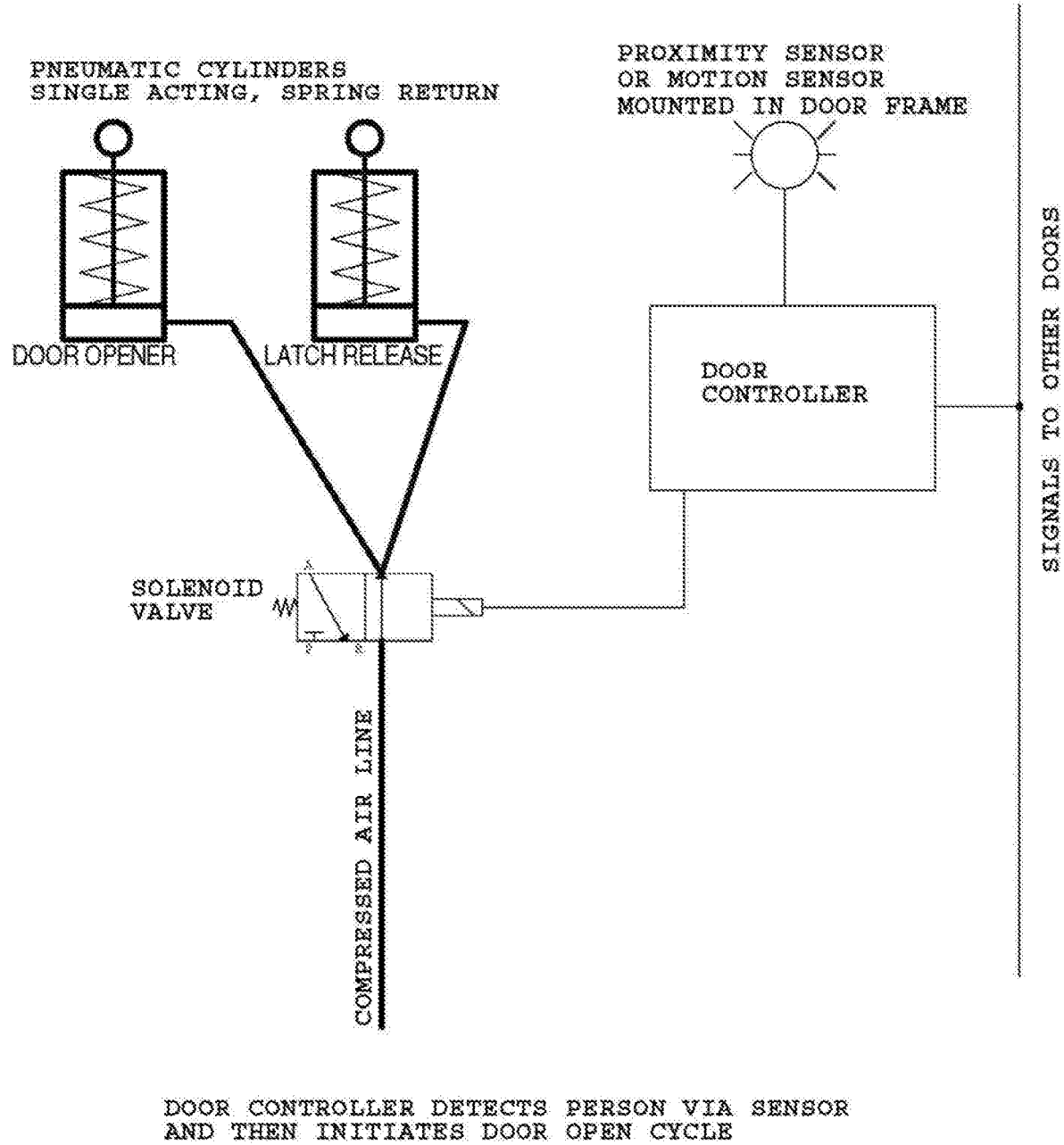
FIG. 4 is a schematic diagram of a system for hands free operation of chute doors, which can be used in conjunction with the method and system disclosed herein.

FIG. 4 is a schematic diagram of a system for hands free, automatic door operation of chute doors, which can be used in conjunction with the methods and systems to automatically determine the level of an open chute door disclosed herein. Typical chute doors must be manually opened, or manually activated via a pushbutton or other such physical item in order to initiate the automatic cycle. In some cases, two hands are required, one to activate the interlock system, and the other to manually open the door. This hands free system provides chute doors with the capability of being operated easily in a hands free manner, for example by people carrying things in both hands such that they do not have a free hand, or by disabled people, or remotely.

The hands-free system combines both electronics and mechanical actuators to provide hands-free operation. The electronics utilize a proximity sensor or motion sensor to detect when somebody wants to open the chute door. The proximity sensor or motion detector is mounted within the chute door frame. This sensor is aimed to detect when something is in front of the chute door and nearby. Once the person is detected, the electronics perform the necessary actions to insure the chute is safe to be opened, and then activates a mechanism that opens the door automatically. In a preferred embodiment, the sensor is connected to an intelligent door controller. The door controller insures it is safe to open the door, and then energizes the solenoid valve. This in turn provides compressed air to the latch release mechanism and the door opener mechanism. The door latch is released, and the door is opened by the opener cylinder. After a short delay, the intelligent controller de-energizes the solenoid valve. This releases the air pressure to the two cylinders, and the normal door closer mechanism closes the door. Once closed, the door is again latched by the normal latching mechanism.

It should be understood that other mechanisms could be used to automatically open a chute door. For example, without limitation, electric motors, linear actuators or hydraulic actuators can be used instead of pneumatic ones.

Also, other ways of sensing when somebody wants to open the chute door could be used instead of a proximity sensor or motion sensor, such as ambient light detectors (a rapid change in ambient light could indicate something just moved in front of the door); or heat sensors (the presence of a heat source within a certain temperature range in front of the door could indicate a person is standing in front of the door).

Each of these embodiments will allow for hands free operation. There is no need to push a button or other physical operation. Simply standing in front of the door, or placing an object to be deposited in the chute in front of the door will cause it to open. These methods provide an ADA compliant chute door, since no force at all is required by the operator to get the door to open. There is no need to calibrate doors to be under the maximum allowed force to open allowed by ADA specifications.

The electro-mechanical control of the door greatly simplifies the design of the automatic opening door. Further, the hands-free system allows the chute door to be operated remotely via electrical signals and controllers. Accordingly, it is possible for a maintenance person, or for the system itself, to send a signal from the base station to a desired door in the chute system to automatically open, and close, the door. When an open door is detected and identified by the methods and systems discussed above, a signal can be sent, either by maintenance personnel from the base station, or generated automatically by the system, to that door for it to open and close. Assuming the signal is successfully received by the door controller, that door if functioning properly will open and then close automatically. This potentially could clear a jam or otherwise cause the door which was open to properly close, thereby resetting the entire chute system back to normal operation, without the need for the maintenance person to go to that door, fix any problem associated with that door, and close it.

It should be understood that the base station can be any suitable computerized system or processing device(s), and can have a suitable user interface for controlling the system from the base station. The user interface can be a control panel with suitable indicators and buttons or switches to indicate which door is not closed and to send a signal to that door to open and/or close. The user interface can also be comprised of computer hardware and software. For example a touchscreen monitor or an associated keyboard and/or mouse can be used, which can selectively display information regarding the status of the chute system, and allow a maintenance person to enter commands to remotely control the doors of the chute system from the base station, or wirelessly through an app on a handheld device.

While the embodiment(s) disclosed herein are illustrative of the structure, function and operation of the exemplary method(s), system(s) and device(s), it should be understood that various modifications may be made thereto with departing from the teachings herein. For example, the open chute door need not generate a countable signal or pulse. The base station processor can count the signals generated from each door between the open door and the base station and then simply add one to the count to determine the open door level. Additionally, the system could count the pulses from the doors above the open door and calculate the open door level by subtracting that count from the total number of levels. Also, the base station could be located on either end of the daisy chain. Any suitable counting of signals and calculations to determine the level of the open door are contemplated. Further, the components of the method(s), system(s) and device(s) disclosed herein can take any suitable form, including any suitable hardware, circuitry or other components capable of adequately performing their respective intended functions, as may be known in the art.

While the foregoing discussion presents the teachings in an exemplary fashion with respect to the disclosed method(s), system(s) and device(s) for automatically determining the level of an open door in chute applications, it will be apparent to those skilled in the art that the present disclosure may apply to other method(s) and system(s) in other applications. Further, while the foregoing has described what are considered to be the best mode and/or other examples, it is understood that various modifications may be made therein and that the subject matter disclosed herein may be implemented in various forms and examples, and that the method(s), system(s) and device(s) may be applied in numerous applications, only some of which have been described herein.

What is claimed is:

1. A system for automatically determining a level of an open chute door, comprising:
   a chute system having a first end and a second end;
   a plurality of chute doors between the first end and the second end of the chute system, the plurality of chute doors each defining a chute door level;
   a base station at the first end of the chute system;
   a terminator at the second end of the chute system;
   an electrical circuit connecting the plurality of doors between the base station and the terminator, the electrical circuit consisting of a first wire being a daisy chain wire and a second wire being a chute busy wire;
   a plurality of door circuits connected to the first wire and the second wire, wherein each chute door of the plurality of chute doors has one of the plurality of door circuits;
   wherein the electrical circuit is adapted to communicate a signal from the door circuits to the base station, wherein the base station is adapted to automatically determine the level of an open chute door.

2. The system of claim 1, wherein the daisy chain wire and the chute busy wire connect each door circuit of the plurality of doors to the door circuit of at least one neighboring door circuit.

3. The system of claim 2, wherein each door circuit has an input/output port that is connected via the electrical circuit.

4. The system of claim 3, wherein each door circuit consists of pulse send/detect circuitry, force circuitry and a switch, and wherein the pulse send/detect circuitry is adapted to generate a countable signal when the switch is open.

5. The system of claim 4, wherein the countable signal is an electrical pulse.

6. The system of claim 4, wherein the countable signal is a voltage level, a current level or a resistance level.

7. The system of claim 4, wherein the countable signal is a frequency level.

8. The system of claim 4, wherein the countable signal is a pulse duration or a pulse delay.

9. The system of claim 4, wherein the base station includes pulse send/detect circuitry adapted to count the countable signal of each door circuit from the open chute door to the base station to determine the level of the open chute door.

10. The system of claim 1, further comprising a hands-free actuation device associated with each chute door for operating the chute door.

11. The system of claim 10, wherein the base station includes a controller for selectively remotely controlling each of the hands-free actuation device associated with each chute door.

12. The system of claim 1, wherein the system for automatically determining the level of an open chute door is configured to automatically determine the level of an open chute door in the absence of configuration devices connecting each chute door to the base station.

13. A chute system, comprising:
a base station at a first end of the chute system;
a terminator at a second end of the chute system;
a plurality of chute doors each located at a respective chute door level between the base station and the terminator;
a circuit for automatically determining the level of an open chute door consisting of a first wire connected between the base station and the terminator, wherein the first wire is a daisy chain wire and a second wire connected between the base station and the terminator, wherein the second wire is a chute busy wire;
a plurality of door circuits connected to the first wire and the second wire, wherein each chute door of the plurality of chute doors has one of the plurality of door circuits;
wherein the plurality of door circuits have circuitry to selectively generate pulses onto the daisy chain wire and wherein the base station has pulse circuitry and a processor to count the pulses and determine the level of the open chute door based upon the number of pulses counted.

14. The device of claim 13, wherein the chute system is configured to automatically determine the level of an open chute door in the absence of configuration devices.

15. A system for automatically determining a level of an open chute door, comprising:
a chute system having a first end, a second end, and a plurality of chute doors between the first end and the second end, wherein each of the plurality of chute doors defines a chute door level;
door circuitry associated with each chute door, wherein the door circuitry consists of pulse circuitry, force circuitry and a switch;
a terminator at one end of the chute system;
a base station at another end of the chute system, the base station and the terminator being connected via a circuit for automatically determining the level of an open chute door, the circuit for automatically determining the level of an open chute door consisting of a first daisy chain wire and a second chute busy wire, and wherein the door circuitry of each chute door is electronically connected to the daisy chain wire and a chute busy wire;
wherein the pulse circuitry is adapted to generate a signal at an open chute door and at each chute door between the open chute door and the base station;
wherein the daisy chain wire communicates the signals generated by the pulse circuitry to the base station; and
wherein the base station has pulse circuitry and a processor adapted to count the generated signals to determine the level of an open chute door in a chute system.

16. The system of claim 15, wherein the door circuitry generates a packet of information at the open chute door and adds the generated signal at the open chute door to the packet of information, wherein the daisy chain wire passes the packet of information to a neighboring chute door, successively for each chute door between the open chute door and the base station, and wherein the signal generated at each neighboring chute door between the open chute door and the base station is added to the packet of information by the door circuitry of each neighboring chute door.

17. The system of claim 16, wherein when a chute door is open,
the switch of the door circuitry associated with that chute door is open.

18. The system of claim 17, further comprising a power supply, wherein when the switch of the door circuitry associated with the open chute door is open, the power supply is disconnected from all chute doors at a chute door level higher than the chute door level of the open chute door.

19. The system of claim 18, wherein when the power supply is disconnected from all chute doors at a chute door level higher than the chute door level of the open chute door, the chute busy wire signals that the chute system is busy, and each switch of the respective door circuitry associated with all chute doors at a chute door level lower than chute door level of the open chute door is open.

20. The system of claim 15, wherein system for automatically determining the level of an open chute door is configured to automatically determine the level of an open chute door in the absence of configuration devices connecting each chute door to the base station.

* * * * *